United States Patent [19]

White

[11] Patent Number: 5,206,043

[45] Date of Patent: Apr. 27, 1993

[54] CONTAINERS AND COMPOSITIONS FOR SEALING THEM

[75] Inventor: Steven A. C. White, Buzzard, England

[73] Assignee: W. R. Grace & Co.-Conn., New York, N.Y.

[21] Appl. No.: 762,664

[22] Filed: Sep. 19, 1991

[30] Foreign Application Priority Data

Nov. 30, 1990 [GB] United Kingdom ............... 9026053

[51] Int. Cl.$^5$ .............................................. B65D 1/02
[52] U.S. Cl. .................................. 426/106; 426/397;
413/9; 413/10; 413/19; 413/20; 215/349;
215/363; 215/364; 220/378; 220/304; 217/56;
217/3 CV
[58] Field of Search ............... 426/106, 131, 397, 392;
413/9, 10, 19, 20; 215/349, 363, 364; 220/378,
304; 217/56, 3 CV

[56] References Cited

U.S. PATENT DOCUMENTS

| | | | |
|---|---|---|---|
| 2,823,422 | 2/1958 | Schneider | 215/349 |
| 3,498,492 | 3/1970 | McCrea | 217/56 |
| 4,316,941 | 2/1982 | Eguchi | 215/364 |
| 4,321,306 | 3/1982 | Eguchi | 215/364 |
| 4,592,690 | 6/1986 | Busch | 413/19 |
| 4,833,206 | 5/1989 | Tajima | 527/187 |

FOREIGN PATENT DOCUMENTS

| | | | |
|---|---|---|---|
| 1112023 | 5/1968 | European Pat. Off. . | |
| 0129309 | 12/1984 | European Pat. Off. . | |
| 0174032 | 3/1986 | European Pat. Off. . | |
| 0331485 | 9/1989 | European Pat. Off. . | |
| 48-14708 | 5/1973 | Japan . | |
| 61-152550 | 7/1986 | Japan | 220/378 |
| 1112025 | 5/1968 | United Kingdom . | |
| 2108943A | 5/1983 | United Kingdom . | |
| 0349304 | 1/1990 | United Kingdom | 215/349 |

OTHER PUBLICATIONS

Hardwick 1982 A Manual for the Brewing and Beverage Industries Chapter 23 Packaging Materials and Beer Quality.
Derwent Publications Abstract, AN-73-269270 of Japanese Patent Application 48014708.

*Primary Examiner*—Carolyn Paden
*Attorney, Agent, or Firm*—John Dana Hubbard; William L. Baker

[57] ABSTRACT

A package formed of a wooden crate or pallet impregnated with a chlorinated phenol and/or anisole wood preservative, one or more bottles containing a potable material, such as beer, a cap on each bottle and a sealing gasket between the bottle and the cap. The gasket is formed of butyl rubber (20 to 80% by weight) and one or more thermoplastic polymers, preferably polyethylene (40 to 60% by weight).

18 Claims, No Drawings

: 1

CONTAINERS AND COMPOSITIONS FOR SEALING THEM

BACKGROUND OF THE INVENTION

A wide variety of processes and compositions have been proposed for forming the gasket in container closures, for instance bottle caps. These include plastisols, solutions in organic solvents, aqueous dispersions (including aqueous latices) and mouldable thermoplastic compositions. They have all been proposed for a variety of container closure types.

A material that has been used very widely for forming the gaskets of, for instance, beer bottles is polyvinyl chloride plastisol. This gives good sealing properties and, in most instances, adequate impermeability to the migration through the gasket of gases, for instance odours from outside the container. However there is currently a desire to avoid the use of polyvinyl chloride in gaskets for containers for potable materials and so it would be desirable to avoid the use of polyvinyl chloride and to devise instead an alternative polymeric composition that could give sealing properties as good as or better than those obtain using polyvinyl chloride. Amongst the materials that could be considered are thermoplastic compositions.

An early disclosure of the use of thermoplastic compositions for forming container closures is in GB 1,112,025. This discusses a wide variety of ways of introducing the compositions into the cap and a wide variety of thermoplastic compositions that can be used. Thus it describes, for instance, blends of ethylene vinyl acetate (EVA) and micro crystalline wax, EVA and low density polyethylene (LDPE) having a melt flow index (MFI) of 7, similar blends containing also butyl rubber having Mooney viscosity of 70, a blend of equal amounts of LDPE having MFI 7 with butyl rubber having Mooney 70, blends of different types of EVA, a blend of LDPE with polyisobutylene, a blend of EVA with ethylene propylene copolymer, an ethylene acrylic acid ester copolymer, a blend of this with LDPE, a blend of LDPE with ethylene propylene copolymer, and a blend of LDPE with chloro sulphonated polyethylene.

Although cold moulding methods were also described in this and in GB 1,112,023, exemplified processes comprised forming a sheet of the appropriate blend, cutting it into discs and inserting the discs into crown closures.

Various disclosures of forming gaskets from thermoplastic compositions have appeared from time to time since then, for instance in EP 331,485, and these have listed a wide variety of polymers that can be used. Generally, most of the polymers named above have been listed.

A paramount need is to avoid off-tastes permeating from outside the container, through the gasket and into the edible composition. A particular problem arises with chlorinated phenols and chlorinated anisoles. The chlorinated phenols are often applied initially as fungicides and the chloro-anisoles are often generated as microbial metabolites of the chlorinated phenols. Polyvinyl chloride gaskets, despite having been found to be generally very satisfactory, do allow small amounts of permeation of such materials and this can, over a long period, contribute to an off-taste. It is therefore desirable to avoid prolonged storage of containers such as beer bottles close to a source of chlorinated phenol or chlorinated anisole. It would therefore be desirable to be able both to replace polyvinyl chloride and, if possible, to obtain a gasket that is even less permeable to chlorinated phenols and chlorinated anisoles.

Despite the very broad disclosure of polymers in GB 1,112,025, the thermoplastic compositions that have mainly been used have been those where the thermoplastic polymer is polyethylene, ethylene vinyl acetate polymer, or a blend of these with each other. Unfortunately such compositions are much worse, as barriers to chlorinated phenols and anisoles than the traditional polyvinyl chloride gasketing compositions. Also it has long been reciprocated that the best sealing properties of all can often be obtained using a cork inlay, frequently with an aluminium facing. However such gaskets, although very effective, tend to be rather uneconomic and they are not satisfactory for pressurised containers.

SUMMARY OF THE INVENTION

A package according to the invention includes a bottle filled with potable material and that is formed of a body, a cap and a sealing gasket between the body and the cap, and the package includes a source of volatile chlorinated phenol or chlorinated anisole, the body and the cap are impermeable to the chlorinated phenol or chlorinated anisole, and the gasket is formed from a thermoplastic composition that is a homogeneous blend of 20 to 60% by weight butyl rubber with 40 to 80% by weight other thermoplastic polymer.

Thus the invention is based on the discovery that these particular compositions (unlike those that have been commercialised and the large numbers of other compositions mentioned in the literature) are capable of giving excellent impermeability to chlorinated phenols and chlorinated anisoles. The resultant compositions are capable of giving impermability as good as the impermeability with polyvinyl chloride and in practice it is often very much better than the impermeability using a polyvinyl chloride gasket.

The invention is of particular value when the package is one that provides a concentration of trichloroanisole in the environment around the bottles of at least $1 \times 10^{-9}$ g/l.

The invention also includes bottle caps containing such gaskets and bottles sealed with such caps. The caps are preferably crown closures but can be roll-on or screw-on closures. They are preferably metal, but can be plastic. The invention is of particular value for glass bottles that are to be pasteurised.

The invention also includes the use of thermoplastic composition that is a homogeneous blend of 20 to 60% by weight butyl rubber with 40 to 80% by weight other thermoplastic polymers, wherein the use is for forming a bottle cap gasket for a bottle that is to be filled with an potable material and is to be packaged in a package that includes a source of volatile chlorinated phenol or chlorinated anisole.

DESCRIPTION OF THE PREFERRED EMBODIMENTS

The described package can be any package that includes a source of chlorinated phenol or chlorinated anisole such that the bottle or bottles within the package will be exposed to vapours of chlorinated phenol or chlorinated anisole during storage. For instance the package could be of jute but is normally wood that may have been accidentally contaminated with a chlorinated material previously or, more usually, has been deliberately impregnated with chlorinated phenol to act as a wood preservation and which is therefore contaminated with chlorinated anisole. The package can be a pallet on which a plurality of bottles are carried, for instance shrink wrapped on to the pallet. Alternatively or additionally the package can be a wooden crate containing the bottles.

Alternatively the package can be a transport container that contains the bottles and wood containing chlorinated phenol or anisole, for instance crates or pallets loaded with the bottles.

The amount of butyl rubber is generally at least about 30% but is usually not more than about 50% by weight of the blend. The butyl rubber is a copolymer of isoprene and butylene. The molecular weight can be relatively low or relatively high. Generally the rubber has Mooney (ML1+8 at 110° C.) of below 60 and preferably below 56.

The one or more other thermoplastic polymers in the blend must be selected such that they can be homogeneously blended with the butyl rubber to form a homogeneous melt which can be extruded and moulded into the cap in a convenient manner to form an adherent gasket having the desired properties. The thermoplastic polymers conventionally mentioned in the literature for thermoplastic gaskets can be used for this purpose and, provided they are blended with butyl rubber in the desired proportions, it is relatively easy to select blends that give the surprising combination of good sealing properties and impermeability to chlorinated phenols and chlorinated anisoles.

Preferred thermoplastic materials are polyethylene or polyethylene copolymers with butylene or other lower alkylenes, polypropylene, thermoplastic rubbers, ethylene propylene copolymers, acid modified ethylene propylene copolymers, styrene butadiene rubber, carboxylated styrene butadiene, polyisoprene, styrene isoprene styrene block copolymers, styrene butadiene styrene block copolymers, styrene ethylene butylene styrene block copolymers, polysytrene, ethylene vinyl acetate copolymers, ethylene (meth) acrylate copolymers and ethylene vinyl alcohol copolymers.

Particularly preferred materials comprises polyethylenes. In some instances, it is preferred to use low density polyethylene but in general high density is more suitable. The melt flow index is typically in the range 5 to 30.

Blends of polyethylene (usually low density polyethylene), ethylene vinyl acetate and the butyl rubber are suitable.

As examples of the invention, blends of the thermoplastic compositions set out below are formed from the respective polymer pellets by melt mixing, and the melt are then inserted into a plurality of bottle crown caps and moulded into annular gaskets, using a commercial lining machine.

The lined crowns are closed on to glass bottles containing carbonated water having a carbonation level of 2.7 volumes and treated with 5% by volume ethanol in order to simulate beer. The bottles are then stored for 14 days at 30° C. in an atmosphere containing 200 µg/l 2,4,6-trichloroanisole (TCA). The bottles are then analysed for TCA content. The results are set out in the following table.

As a comparison, it should be noted that when a foamed plasticised PVC gasket is subjected to the same test, the measured TCA content at the end of the storage period is 123 ng/l.

The results are set out in the following table.

It will be observed from these results that the gaskets formed from the materials usually used for thermoplastic container sealing compositions (G, H and I) all give poor results that are significantly worse than the polyvinyl chloride composition mentioned above. All the compositions illustrated in the table and that contained a butyl rubber give very much better results. Composition F, containing cross linked butyl rubber, is not as good as the others and this may be due to difficulties in obtaining a homogeneous blend, due to the cross linking.

TABLE

|  | A | B | C | D | E | F |
|---|---|---|---|---|---|---|
| PE1 | 50 | — | — | — | — | — |
| PE2 | — | 50 | — | 50 | 50 | 50 |
| PE3 | — | — | 50 | — | — | — |
| BU1 | 50 | 50 | 50 | — | 20 | — |
| BU2 | — | — | — | 50 | — | — |
| BU3 | — | — | — | — | 30 | 40 |
| TCA Content (ng/l) | <1 | <1 | <1 | <1 | <1 | 12 |

|  | G | H | I | J | K | L |
|---|---|---|---|---|---|---|
| PE1 | 10 | — | 50 | — | — | — |
| PE2 | — | — | — | 40 | 50 | 60 |
| EVA1 | — | 100 | 50 | — | — | — |
| EVA2 | — | — | — | 20 | — | — |
| BU1 | — | — | — | 40 | 50 | 40 |
| TCA Content (ng/l) | 1005 | 1160 | 370 | <2 | <2 | <2 |

PE1: Low density polyethylene MFI: 7, Density: 0.918
PE2: Low density polyethylene MFI; 20, Density: 0.918
PE3: High density polyethylene MFI: 11, Density 0.950
BU1: Low molecular weight isoprene/butylene copolymer. Mooney viscosity (ML1 + 8 at 110° C.): 43-47
BU2: High molecular weight isprene/butylene copolymer Mooney viscosity (ML1 + 8 at 125°): 46-56
BU3: Cross-linked isoprene/butylene copolymer
EVA1: Ethylene vinyl acetate copolymer 9% vinyl acetate, MF19
EVA2: Ethylene vinyl acetate copolymer 18% vinyl acetate, MF19

While preferred embodiments of this invention have been described in detail hereinabove, it is to be understood that many changes and modifications may be made by those skilled in the art without departing from the scope and spirit of this invention.

What is claimed is:

1. A package comprising a wood structure wherein the wood structure has been impregnated with a chlorinated substance, a bottle filled with a potable material, a cap and a sealing gasket between the bottle and the cap, wherein the gasket is formed of a thermoplastic composition that is a homogeneous blend of from about 20 to about 60% by weight of the composition of butyl rubber formed a copolymer of isoprene and butylene and has a Mooney viscosity (ML1+8 at 110° C.) of below 50 and from about 40 to about 80% by weight of the composition of one or more thermoplastic polymers and wherein the thermoplastic composition is impermeable to chlorinated substances selected from the group consisting of chlorinated phenols, chlorinated anisoles and both.

2. The package of claim 1 wherein the amount of butyl rubber is from about 30 to about 50% by weight of the composition.

3. The package of claim 1 wherein the thermoplastic polymer is selected from polyethylene, a polyethylene copolymer with other lower alkylenes, polypropylene, thermoplastic bottles, ethylene propylene copolymers, acid modified ehtylene propylene copolymers, styrene butadiene rubber, carboxylated styrene butadiene, polyisoprene, styrene isoprene styrene block copolymers, styrene butadiene styrene block copolymers, styrene ethylene butylene styrene block copolymers, polystyrene, ethylene vinyl acetate copolymers, ethylene (meth) acrylate copolymers and ethylene vinyl alcohol copolymers.

4. The package of claim 1 wherein the thermoplastic polymer is polyethylene.

5. The package of claim 1 wherein the structure is selected from the group consisting of wood pallets, crates or containers containing wood, and wherein the wood has been impregnated with a chlorinated phenol wood preservative.

6. A method of preventing the ingress of chlorinated substances into a potable material comprising forming a gasket of from about 20 to about 60% by weight of the composition of butyl rubber and from about 40 to about 80% by weight of the composition of one or more thermoplastic polymers, placing the gasket in a cap and sealing the cap to a body containing the potable material.

7. The method of claim 6 wherein the thermoplastic polymer is selected from polyethylene, polyethylene copolymer with other lower alkylenes, polypropylene, thermoplastic rubbers, ethylene propylene copolymers, acid modified ehtylene propylene copolymers, styrene butadiene rubber, carboxylated styrene butadiene, polyisoprene, styrene isoprene styrene block coplymers, styrene butadiene styrene block copolymers, styrene ethylene butylene styrene block copolymers, polystyrene, ethylene vinyl acetate copolymers, ethylene (meth) acrylate copolymers and ethylene vinyl alcohol copolymers.

8. The method of claim 6 wherein the thermoplastic polymer is polyethylene.

9. The method of claim 6 wherein the butyl rubber is a copolymer of isoprene and butylene.

10. The method of claim 6 wherein the gasket is molded into the cap.

11. The method of claim 6 wherein the chlorinated substances are selected from the group consisting of chlorinated phenols, chlorinated anisoles or both.

12. A package comprising a wood structure selected from the group consisting of pallets and crates wherein the wood has been impregnated with a chlorinated substance selected from the group consisting of chlorinated phenols, chlorinated anisoles and both, a bottle filled with potable material and that is formed of a body, a cap and a sealing gasket between the body and the cap, wherein the gasket is formed from a thermoplastic composition that is a homogeneous blend of about 20 to about 60% by weight of the composition of butyl rubber formed a copolymer of isoprene and butylene and has Mooney (ML1+8 at 110° C.) of below 50 and from about 40 to about 80% by weight of the composition of a thermoplastic polymer.

13. The package of claim 12 wherein the amount of butyl rubber is from about 30 to about 50% by weight of the composition.

14. The package of claim 12 wherein the thermoplastic polymer is selected from the group consisting of polyethylene, polyethylene copolymer with other lower alkylenes, polypropylene, thermoplastic rubbers, ethylene propylene copolymers, acid modified ehtylene propylene copolymers, styrene butadiene rubber, carboxylated styrene butadiene, polyisoprene, styrene isoprene styrene block coplymers, styrene butadiene styrene block copolymers, styrene ethylene butylene styrene block copolymers, polystyrene, ethylene vinyl acetate copolymers, ethylene (meth) acrylate copolymers and ethylene vinyl alcohol copolymers.

15. The package of claim 12 wherein the thermoplastic polymer is polyethylene.

16. A package comprising a wood structure selected from the group consisting of pallets and crates wherein the wood has been impregnated with a chlorinated wood preservative selected from the group consisting of chlorinated phenols, chlorinated anisoles or both, the package further comprising one or more bottles, the one or more bottles containing a potable material and being sealed by a cap containing a sealing gasket, the gasket being formed of a homogeneous blend of from about 20 to about 60% by weight of the blend of butyl rubber and from about 40 to about 80% by weight of the blend of one or more thermoplastic polymers.

17. The package of claim 16 wherein the wood structure is a pallet impregnated with a chlorinated phenol wood preservative, the butyl rubber is present in an amount of from about 30 to about 50% by weight of the blend and is formed from a copolymer of isoprene and butylene and the one or more thermoplastic polymers is selected from the group consisting polyethylene, polyethylene copolymer with other lower alkylenes, polypropylene, thermoplastic rubbers, ethylene propylene copolymers, acid modified ehtylene propylene copolymers, styrene butadiene rubber, carboxylated styrene butadiene, polyisoprene, styrene isoprene styrene block coplymers, styrene butadiene styrene block copolymers, styrene ethylene butylene styrene block copolymers, polystyrene ethylene vinyl acetate copolymers, ethylene (meth) acrylate copolymers and ethylene vinyl alcohol copolymers.

18. The package of claim 16 wherein the one or more thermoplastic polymers is polyethylene.

* * * * *